Feb. 24, 1953     E. J. THURBER     2,629,266
TORQUE CONVERTER
Filed Sept. 12, 1949     3 Sheets-Sheet 1
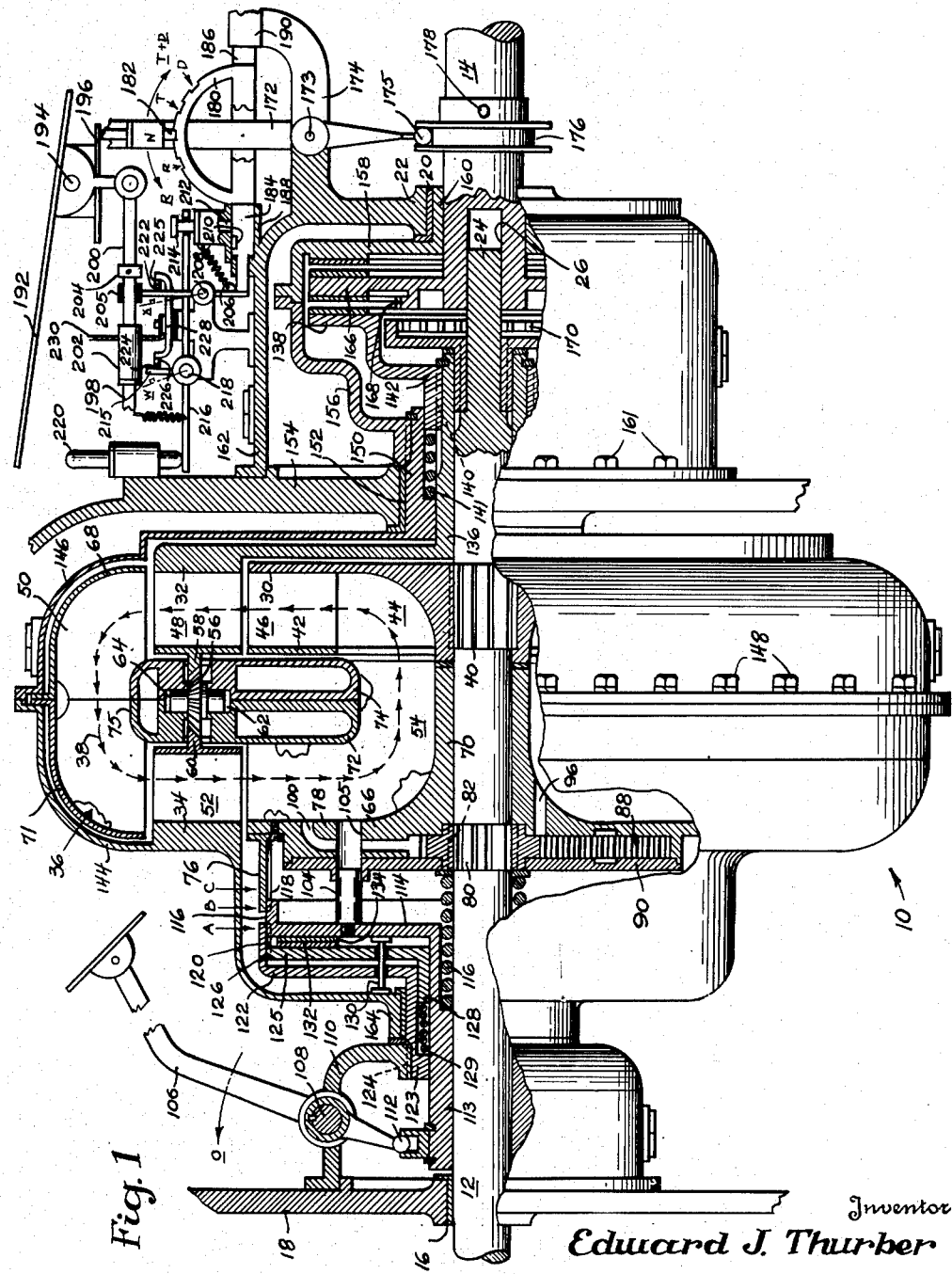
Fig. 1
Inventor
Edward J. Thurber
By 
ATTORNEYS

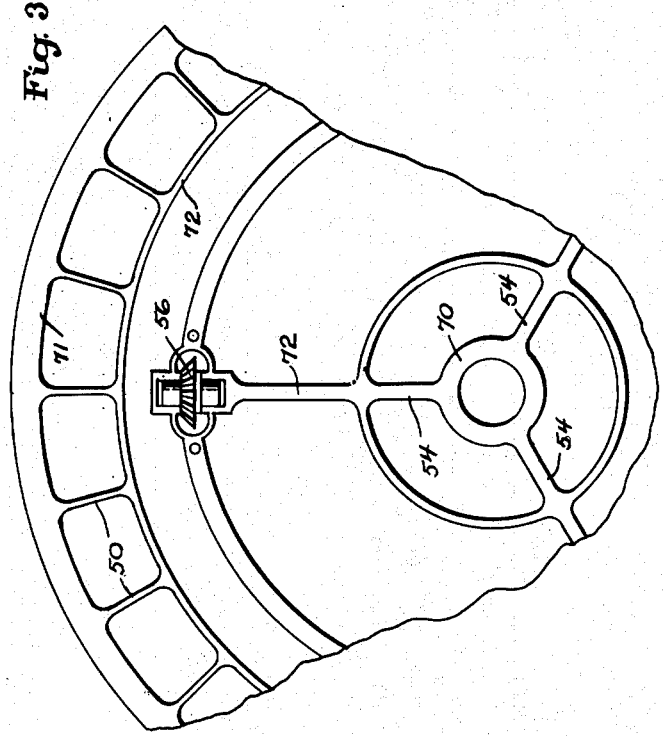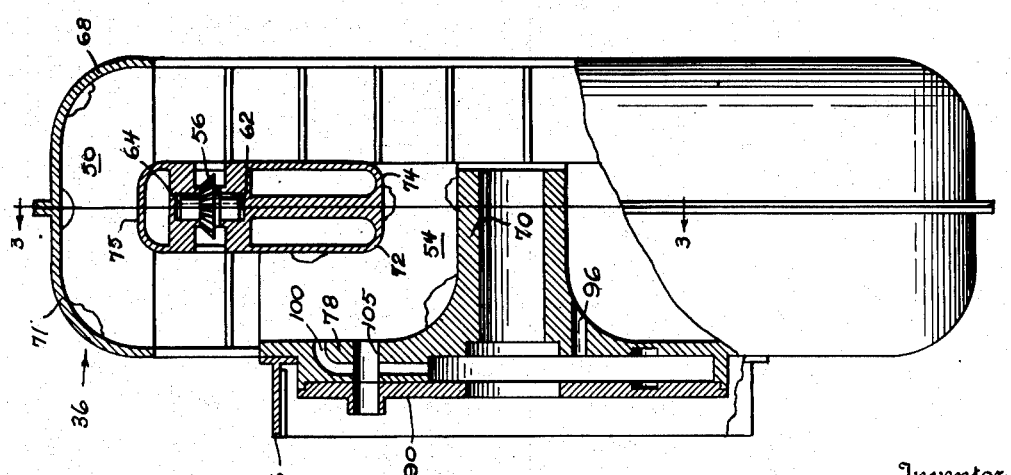

Feb. 24, 1953 E. J. THURBER 2,629,266
TORQUE CONVERTER
Filed Sept. 12, 1949 3 Sheets-Sheet 3

Inventor
Edward J. Thurber

By
Scrivener & Parker
ATTORNEYS

Patented Feb. 24, 1953

2,629,266

UNITED STATES PATENT OFFICE 2,629,266

TORQUE CONVERTER

Edward J. Thurber, New Orleans, La., assignor to The Thurber Corporation, New Orleans, La., a corporation of Louisiana Application September 12, 1949, Serial No. 115,217

36 Claims. (Cl. 74—645)

This invention relates to a variable speed hydraulic transmission and more particularly to a hydraulic transmission of the torque converter type which is adapted to provide a highly efficient power transmission for motor vehicles or other types of installations.

One of the principal objects of the present invention is to provide a novel hydraulic torque converter of the double rotating type wherein a pair of turbines are employed, these being so bladed and arranged as to rotate in opposite directions, and being connected in a novel manner so that the torques generated thereby may be compounded and delivered at a common terminal point.

Another object of the invention is to provide an arrangement wherein the turbines rotate in opposite directions and the delivered torques may be directly employed for securing a forward or a reverse turbine drive without the necessity of utilizing a conventional forward and reverse gear transmission.

Still another object is to provide in a transmission of the forgoing character, a novel construction wherein an absolute neutral point is established and wherein a direct drive may be effected in addition to the selective forward and reverse turbine drives.

A still further object comprehends a highly efficient method of compounding the torque of the oppositely rotating turbines, the same including a novel gearing arrangement which cooperates with the turbines and the reactionary member of the torque converter and which is positioned in the center of the fluid working circuit.

Another object resides in the provision of a manually operable construction for selectively establishing forward or reverse turbine drive, or a direct drive, the arrangement being such that upon completion of either of the turbine drives, the combined torques of the oppositely rotating turbines are delivered to the output shaft.

A further object is to provide in a transmission of the above type, a novel arrangement for automatically establishing certain of the driving connections, wherein during operation upon a motor vehicle, the selection of the driving connection may be accomplished as a secondary function of a motor vehicle controlling member, such as the accelerator pedal.

A still further object is to provide a novel construction for controlling the fluid guide or reactionary member at the will of the operator so that such member may function as a variable control element with respect to the fluid circuit.

Still another object comprehends a fluid transmission of the above type which includes a novel control of the fluid guide member which is arranged in such a manner as to be capable of rendering the fluid working circuit inoperative to thus interrupt the transmission of torque through the converter.

Another object is to provide a novel and cooperative construction between a motor vehicle brake controlling element and the control of the fluid guide member so that an effective declutching of the torque converter may be effected prior to application of the vehicle brakes.

Still another object relates to the control of the transmission during certain of the selective shifting operations, the construction being such that the torque is interrupted before the shift is made and is restored after the shift is completed.

A still further object includes a novel arrangement of the various elements constituting the hydraulic transmission, as for example, a unit construction for the fluid guide member which provides an integral unit for facilitating assembly thereof with the turbine and impeller elements.

A further object is to provide in a transmission of the above type, a novel arrangement for automatically and/or semi-automatically establishing certain driving connections, wherein during the operation of the motor vehicle, the selection of the driving connection may be accomplished as a secondary function of a motor vehicle controlling member, such as, an accelerator pedal operating in conjunction with a speed responsive device.

Still another object is to provide in a transmission of the foregoing character, a novel construction wherein a direct drive can be established and the fluid circulation stopped, allowing the fluid to rotate with the casing for cooling said fluid.

The above and other novel features of the invention will appear more fully hereinafter from a consideration of the following detailed description when taken in connection with the accompanying drawings. It is expressly understood however, that the drawings are utilized for purposes of illustration only and are not designed as a definition of the limits of the invention, reference being had for this purpose to the appended claims.

In the drawings, wherein similar reference characters refer to similar parts throughout the several views, Fig. 1 is a side view partly in section of a hydraulic transmission mechanism and associated controls which embody the principles of the present invention;

Fig. 2 is a side view partly in section of the fluid guide member when in assembled condition;

Fig. 3 is a front view of a portion of one of the units comprising the fluid guide member, taken substantially along lines 3—3 of Fig. 2;

Figure 4:
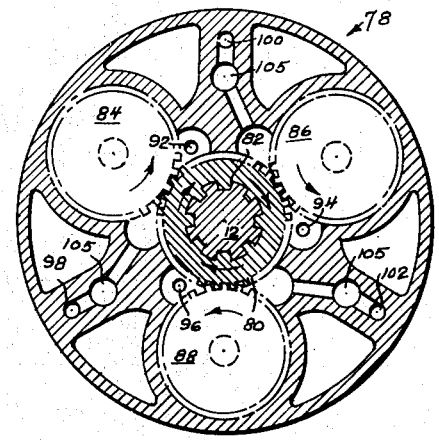
Fig. 4 is a sectional view of the hydrostatic clutch device provided for controlling the operation of the fluid guide member.

Referring more particularly to Fig. 1, the novel variable speed transmission of the present invention is shown therein as being of the hydraulic torque converter type and comprises a fluid unit 10 which is arranged to drivably connect a driving shaft 12 with an output or driven shaft 14, the driving shaft 12 being rotatably mounted in a front bearing 16 supported by a forward stationary casing part 18, and the output shaft 14 being rotatably supported in a rear bearing 20 carried by a rear casing part 22. At its rear end, the driving shaft 12 is provided with a reduced end 24 which is piloted within a bore 26 of the output shaft 14.

One of the important and novel features of the invention resides in the construction and arrangement of the fluid unit 10 which provides an unusually simplified torque converter structure which is operable in a highly efficient manner. More particularly, the fluid unit 10 comprises an impeller 30 which is cooperable with primary and secondary turbines 32 and 34 and with a fluid guide member 36 to establish a fluid working circuit as shown by the arrows 38. As shown, the impeller 30 is splined at 40 to the driving shaft 12 and is provided with a side ring 42, an intake manifold 44 and a plurality of radially spaced blades 46, of suitable construction, the latter delivering the working fluid to the primary turbine 32 which is provided with a plurality of blades 48, which are so contoured as to rotate the primary turbine 32 in the same direction as the impeller. Fluid exhausted radially outward from the blades 48 is received and redirected radially inward by blades 50 carried by the fluid guide member 36, to the secondary turbine 34, the latter being provided with a plurality of blades 52 which are so curved as to rotate the secondary turbine 34 in a direction opposite to that of the primary turbine. Thereafter, the fluid is received by the blades 54 of the fluid guide member 36 and is conducted to the intake manifold 44 of the impeller 30, it being pointed out that the blades 52 in the turbine 34 are so arranged and curved that the fluid exhausted therefrom will be rotating in the same direction as that of the impeller 30.

A novel arrangement is provided by the invention for coordinating the functions of the fluid guide member 36 and the primary and secondary turbines 32 and 34 so that the torques delivered by the latter are compounded. More particularly and as shown in Fig. 1, the fluid guide member 36 rotatably carries three radially spaced bevel pinions 56 which mesh with bevel ring gears 58 and 60 which are respectively formed or secured to the turbines 32 and 34. The pinions 56 are rotatably supported by inner and outer bearing portions 62 and 64 of the fluid guide member 36, and preferably the latter is formed in two sections 71 and 68 for facilitating assembly of the parts. This construction, see Fig. 2, enables the pinions 56 to be assembled centrally with respect to the fluid guide unit sections 71 and 68, following which, the said sections may be welded together to secure a unitary arrangement. When the sections 71 and 68 are welded, the fluid guide member 36 comprises a hub 70 to which the inner blades 54 are secured, an outer casing 68 and 71 carrying the outer blades 50, and a center section 72, 74 and 75 which is secured to the blades 54 and which supports the pinions 56. Also forming a part of the unitary fluid guide member 36 is an anchor brake gear 76 and a hydrostatic clutch 78, these parts being provided for a purpose which will appear more fully hereinafter.

It will be noted from the above, that the center section 72, 74 and 75 of the fluid guide member 36 not only serves to rotatably support the torque transfer pinions 56 but is also positioned within the central portion of the toroidal path 38 of the working fluid. In this manner any tendency for surplus fluid to accumulate in this area is eliminated.

Novel means are provided by the invention for controlling the operation of the fluid guide member 36 in order to variably influence the fluid working circuit 38. For example, the member 36 may be held stationary in order that full and complete conversion of torque may be obtained. On the other hand, the member 36 may be rotated at the same speed as the impeller, this method of operation serving to effectively interrupt the fluid working circuit to discontinue the transmission of torque between the driving shaft 12 and the output shaft 14. Intermediate these extremes, the operator may control the speed of rotation of the member 36 in order to secure variations in the torque transfer to meet variable conditions which may be encountered. More particularly, see Figs. 1 and 4, such means includes the hydrostatic clutch 78 which comprises a central pump gear 80, splined to the driving shaft 12 at 82, and in constant meshing engagement with three rotatably mounted mating gears 84, 86 and 88. This assembly is sealed by a cover plate 90 and also includes three intake passages 92, 94 and 96, and three exhaust passages 98, 100 and 102, all of these passages communicating with the fluid circuit 38, as shown in Fig. 1. By reason of this construction, it will be readily seen that the mating gears 84, 86 and 88 will rotate on their axes so long as the flow of fluid through the passages 92, 94, 96, 98, 100 and 102 is unobstructed.

For the purpose of controlling the operation of the hydrostatic clutch 78 and hence the speed of rotation of the fluid guide member 36, a cylindrical valve 104 is provided for each of the exhaust passages 98, 100 and 102 in order to variably restrict the exhaust of the fluid after passing through the gear pumps comprising the gears 80, 84, 86 and 88. This arrangement is such that the valves 104 may completely close the exhaust passages 98, 100 and 102, or gradually open communication between the exhaust passages and the gear pumps, it being understood that the valves 104 are received within cylindrical bores 105 which are respectively associated with the exhaust passages. From the above, it will be readily understood that in the event the valves 104 are closed, then the working fluid is locked within the hydrostatic clutch 78 and that therefore the latter and the fluid guide member 36 rotate at the same speed as the driving shaft 12 and the impeller 30. On the other hand, should the valves 104 be fully opened, the gear pumps comprising the gears 80, 84, 86 and 88 will merely pump the fluid from the intake passages 92, 94 and 96 through the exhaust passages 98, 100 and 102 without increase of pressure and hence, the clutch 78 and fluid guide member 36 can remain stationary. Any desirable speed of rotation of the fluid guide member 36 from zero to maximum may be readily obtained by controlling the degree of closure of the valves 104 in order to restrict the exhaust of fluid from the gear pumps.

A novel construction is provided in order to secure a variation in the positioning of the valves 104 for the purpose of variably controlling the speed of rotation of the fluid guide member 36. As shown, such construction includes a manually operable pedal 106, which may be pivotally mounted at 108 to a stationary casing section 110, and which is provided at its lower end with a yoke connection 112 associated with the sleeve 113 of a shiftable brake and clutch member 114. As shown, the valves 104 are secured to the member 114 so that they may be moved toward closed position when the pedal 106 is moved in the direction of the arrow O, as viewed in Fig. 1, against the tension of a spring 116. Preferably, the pedal 106 is the usual vehicle brake operating pedal, the arrangement being such that a sufficient lost motion exists in the brake operating linkage to enable valves 104 to close prior to application of the vehicle brakes. It is desired to point out here, that with the valves 104 closed, rotation of the fluid guide member 36 effectively interrupts the transmission of torque between the driving shaft 12 and the output shaft 14 through the fluid unit 10. This action is caused by the accumulation of the working fluid in the area of the fluid guide member defined by the vanes 50, it being understood that due to the centrifugal force acting on the fluid, the latter will not flow radially inward through the blades 52 of the secondary turbine 34. Therefore when the fluid guide member 36 is rotated, as stated, the working fluid is withdrawn from the working circuit. Hence with the arrangement proposed, the necessity of installing a separate and expensive heavy-duty clutch in order to interrupt the transmission of torque is avoided.

From the foregoing, it is seen that with the valves 104 completely open, as shown in Fig. 1, the hydrostatic clutch 78 and the fluid guide member 36 can remain stationary. Since there may be some tendency for these parts to rotate at slow speed, due to the action of the working fluid, the invention preferably provides a construction for positively maintaining the member 36 stationary when the valves 104 are open. To this end, the brake and clutch member 114 is formed with a toothed peripheral flange 116 which, as shown in Fig. 1, at position A, not only engages the internal teeth 118 of the gear 76, but also the internal teeth 120 of an anchor gear 122. Since the latter is provided with a sleeve 123 which is splined at 124 to the stationary casing part 110, it will be readily understood from the foregoing that under the conditions stated, the member 114, the gear 76, and the guide member 36 will be positively prevented from rotation. However, as the pedal 106 is moved in the direction O to shift the brake and clutch member 114 to the right to position B, the toothed flange 116 will first be disengaged from the teeth 120 before the valves 104 restrict the exhaust of fluid through the exhaust passages 98, 100 and 102. Hereafter, as the member 114 is moved from position B to position C, the valves 104 serve to restrict the flow of fluid through the aforesaid exhaust passages in order to vary the speed of rotation of the fluid guide member 36.

Preferably, a synchronizing means is associated with the brake and clutch member 114 and with the anchor gear 122 in order to facilitate meshing engagement between these parts when the pedal 106 is allowed to return to its normal position and the member 114 is moved to the left, as viewed in Fig. 1, under the influence of the spring 116. As shown, such synchronizing means comprises a synchronizing disk 125 having peripheral gear teeth 126 always engaging the teeth 120, and provided with a sleeve 128 to enable the disk 125 to be moved along the sleeve 113 in opposite directions. A spring 129 constantly tends to move the disk 125 to the right, as viewed in Fig. 1, such movement being limited by means of a plurality of headed limit pins 130 receivable within suitable openings in the anchor gear 122 and the disk 125. The latter and the member 114 respectively carry opposed brake linings 132 and 134 which are in engagement when the parts occupy the normal position illustrated in Fig. 1.

From the foregoing construction, it will be readily understood that the limit of movement of the disk 125 with respect to the anchor gear 122 will be determined by the limit pins 130 and that accordingly, the teeth 126 and 120 of these respective parts will always be engaged. Hence, as the member 114 is allowed to move from position B toward position A, in accordance with the return movement of the pedal 106, and in response to the action of the spring 116, the brake linings 132 and 134 will first engage in order to retard and finally arrest rotation of the member 114. Thereafter, the member 114 and the synchronizing disk 125 will move together against the tension of the spring 129 and the toothed flange 116 of the member 114 will again engage the teeth 120 of the anchor gear 122. In this manner the rotation of the member 114, and the parts secured thereto including the gear 76 and the fluid guide member 36 will be gradually stopped, then arrested, and finally locked against rotation. It will also be observed that so long as the pedal 106 occupies the normal position illustrated in Fig. 1, and the member 114 is locked at its periphery through engagement of the teeth 116 and 120, the fluid guide member 36 will be positively locked in a stationary position, and the fluid unit 10 will function to transmit torque.

In addition to the foregoing features, the present invention provides a novel construction for selectively transferring the combined torques of the turbines 32 and 34 to the output shaft 14 to obtain a forward or reverse fluid drive, the arrangement also securing an absolute neutral position and moreover including mechanism for establishing a direct and positive drive between the driving shaft 12 and the output shaft 14. More particularly, and referring to Fig. 1, the primary turbine 32 is provided with a sleeve 136 which rotatably surrounds the driving shaft 12 and is drivably connected with a primary turbine driving clutch 138 through a plurality of splines 140. Normally the clutch 138 is resiliently urged, as by an ejector spring 141, to a position where it engages a snap ring 142 received by the rear end of the sleeve 136. However, due to the splined connection and the spring 141, the clutch 138 may be moved in a direction opposite to that referred to, this operation being for a purpose to be described in detail hereinafter.

In order to provide a compact arrangement and one wherein the torque of the secondary turbine 34 may be delivered at a point adjacent the clutch 138, the former comprises forward and rear casing sections 144 and 146, respectively, which are secured together by a plurality of screws 148, the rear section 146 being provided with a sleeve 150 which is interposed between the sleeve 136 and a bearing 152 supported by a fixed casing section 154. As shown, the sleeve 150 is splined to a flanged member 156 which is rigidly connected to a secondary turbine driving clutch 158, the latter having a sleeve portion 160 which is interposed between the output shaft 14 and the bearing 20. Casing section 22 is shown as being extended and connected to the section 154 by a plurality of screws 161 in order to provide a selector casing 162 which forms a housing for the clutches 138 and 158. At its forward end, the forward casing section 144 provides a housing for the hydrostatic clutch 78 and the control members 122, 125 and 114, the section being formed with a sleeve 164 in order to rotatably mount the same with respect to the fixed sleeve 123.

Means are provided for selectively connecting the output shaft 14 with either of the clutches 138 or 158 and in the form shown, such means also includes an arrangement for directly connecting the driving shaft 12 with the output shaft 14 in order to establish a direct drive. More particularly, a shiftable clutch 166 is secured to the output shaft 14 in any suitable manner in order to be selectively engageable with either of the clutches 138 or 158 as the shaft 14 is shifted in one direction or the other. To establish a direct drive, the clutch 166 is formed with a direct drive driven clutch element 168 which is adapted to engage a direct drive driving clutch element 170 which is rigidly secured to the driving shaft extension 24. Preferably, the clutch elements 168 and 170 are of the gear type and driving engagement therebetween is effected by continued axial shifting of the clutch 166 after it has engaged the primary turbine driving clutch 138. It will be understood that such continued axial movement is readily permitted due to the sliding action of the clutch 138 on the sleeve 136 and the yieldability of the spring 141. As shown, the faces of the clutches 138, 158 and 166 are provided with suitable friction linings.

In order to effect the aforementioned axial shifting movements of the clutch 166, a manually operable selecting lever 172 is pivoted at 173 to a stationary arm 174 and has its lower end 175 in constant engagement with a shifting yoke 176 which is secured to the output shaft 14 as by a pin 178. The upper end of the lever 172 cooperates with a segment 180 which is provided with notches R, N, T and D adapted to selectively receive a latch 182 carried by the lever 172 as the latter moves about its pivotal mounting 173. With this construction, it will be readily understood that when the latch 182 occupies the N notch, the shiftable clutch 166 will occupy the absolute neutral position shown, and the transmission will have no tendency to rotate the output shaft 14. To establish a reverse fluid drive, the selector lever 172 is moved to bring the latch 182 to notch R, whereupon the clutch 166 will be shifted axially to the right in order to frictionally engage the secondary turbine clutch 158. When this occurs, the combined torque of both the turbines 32 and 34, compounded through the ring gears 58 and 60 and the bevel pinions 56, will be delivered to the output shaft 14 to drive the latter in reverse.

When the selector lever 172 is moved to bring the latch 182 into engagement with the notch T, the clutch 166 is shifted to the left, as viewed in Fig. 1, in order to engage the primary turbine clutch member 138. When this occurs the compounded torque from both the turbines 32 and 34 will be delivered through the engaged clutches 166, 138 to the output shaft to establish forward fluid drive. As has been previously pointed out, a direct drive is established by moving the clutch 166 a further distance to the left after clutches 166 and 138 have been engaged, in order to shift the clutch 138 against the tension of the spring 141 and engage the direct drive clutch members 168 and 170. This action is brought about by moving the selector lever 172 to a position where the latch 182 is received by the notch D. From the foregoing, it will be seen that the notches R, N, T and D define positions to which the selector lever 172 may be moved in order to establish fluid reverse, neutral, fluid forward, and direct drive.

In the event that the hydraulic transmission heretofore described is utilized in a motor vehicle, the present invention includes a novel arrangement for automatically and/or semi-automatically effecting certain of the shifting movements of the lever 172 in accordance with operation of the usual accelerator pedal or throttle control member of the engine carburetor. As shown, such means includes a construction for shifting the segment 180 in order to shift the position of the selector lever 172. More particularly, the segment 180 is provided with a pair of plungers 184 and 186 which are respectively received within front and rear bearings 188 and 190, it being pointed out that the rear plunger 186 is constantly resiliently urged toward the left, as viewed in Fig. 1, as by incorporating a suitable spring loaded device, not shown, in the bearing 190. An accelerator pedal 192 is pivotally mounted at 194 to a stationary part 196 and is connected to a carburetor throttle rod 198 by a link 200. In order to permit movement of the pedal 192 beyond its throttle operable position, the link 200 and rod 198 are interconnected by a spring loaded device 202, it being observed that should the pedal 192 be rocked backwardly a sufficient distance as to bring a collar 204, carried by the link 200, into engagement with an eye 205, formed on the upper end of segment shifting lever 206, and be then moved a further distance, such movement would move the lever 206 about its pivotal mounting 208 and cause the lower end thereof to shift the plunger 184 and the segment 180 toward the right, as viewed in Fig. 1, and against the spring loading of the rear plunger 186. With the selecting lever previously established in notch T for forward fluid drive, this action would cause a further pivotal movement of the lever 172 to establish forward direct drive by bringing the clutches 168 and 170 into driving engagement. A slot 210 is formed in the bearing 184 and is adapted to receive a spring loaded pin 212 to latch the segment 180 in the direct drive position referred to above. With the parts in such position, there is a lost motion space between the head 214 of the pin 212 and segment releasing lever 216, the latter being pivoted at 218 and extending into the path of movement of a spring loaded plunger 220.

Following the automatic shift of the transmission to forward direct drive, should it be desired to shift into forward fluid drive, the accelerator pedal 192 is moved downwardly beyond its full throttle position in order to contact and move the plunger 220 downwardly. This action, permitted by the spring loaded device 202, causes the lever 216 to be rocked about its pivot 218 and withdraws the latching pin 212 from the slot 210 through cooperation between the lever 216 and the head 214. As soon as this occurs, the spring loading of the rear plunger 186 and the ejector spring 141 effects a shifting movement of the segment 180 and the selector lever 172 toward the left. This action causes the lever 172 to be moved about its pivot 173 and shifts the clutch 166 out of engagement with clutch 170 while maintaining engagement between the clutch 166 and the primary turbine clutch member 138. Thus with a simple movement of the accelerator pedal, the drive may be automatically and/or semi-automatically shifted between forward direct drive and forward fluid drive.

Novel means are provided for momentarily interrupting the torque of the motor vehicle engine prior to the aforementioned automatic shifting operations and for re-establishing the torque after the shifts have been accomplished. As shown, such means is arranged to momentarily interrupt and re-establish the engine ignition system in timed relation with the shifting operations, and includes movable grounded ignition contacts 222 and 224, respectively carried by the lever 206 and an arm 215 of lever 216 and which are normally in engagement with fixed contacts 225 and 226 which are positioned at opposite ends of a terminal member 228. The latter is insulated from ground and is connected to the ignition system ground wire 230, and the arrangement is such that the engine ignition system is operative so long as one or the other movable contact 222 or 224 engages its associated fixed contact 225 or 226, and is hence grounded. However, when both sets of contacts 222, 225 on the one hand, and 224, 226 on the other are separated, the engine ignition system is inoperative and the engine torque will be interrupted. With the foregoing arrangement, it will be readily seen that after the selector lever has been manually moved to position T to establish the forward fluid drive, and the accelerator pedal 192 is rocked rearwardly to move the lever 206 to the dotted line position shown at X, the segment 180 will be automatically shifted to the right, as viewed in Fig. 1, and a direct drive will be established as heretofore described. Even though, during this operation, contacts 222 and 225 have become separated, the ignition circuit will be maintained in an operative condition through the engaged contacts 224, 226. As soon, however, as the accelerator pedal 192 is moved forwardly to contact and move the plunger 220, for the purpose of disengaging direct drive clutches 168 and 170, the ignition circuit will be interrupted as soon as the lever 216 and arm 215 are moved sufficiently to disengage contacts 224 and 226. Under these conditions, arm 215 is moved to the dotted line position shown at W. Continued movement of the lever 216 about its pivot 218 will finally withdraw the latching pin 212 from the slot 210 and allow the spring-urged plunger 186 and ejector spring 141 to shift the segment 180 and the selector lever 172 to disconnect the forward direct drive and establish the forward fluid drive.

It will be noted that as the forward plunger 184 of the segment 180 is returned to the position shown, lever 206 will be engaged by the plunger 184 and moved to the full line position shown, whereupon the ignition circuit will be re-established upon engagement of contacts 222 and 225. Thus it will be seen that the ignition and the engine torque are interrupted prior to the shift from direct drive to turbine drive and are re-established as soon as the shift is completed.

Figure 5:
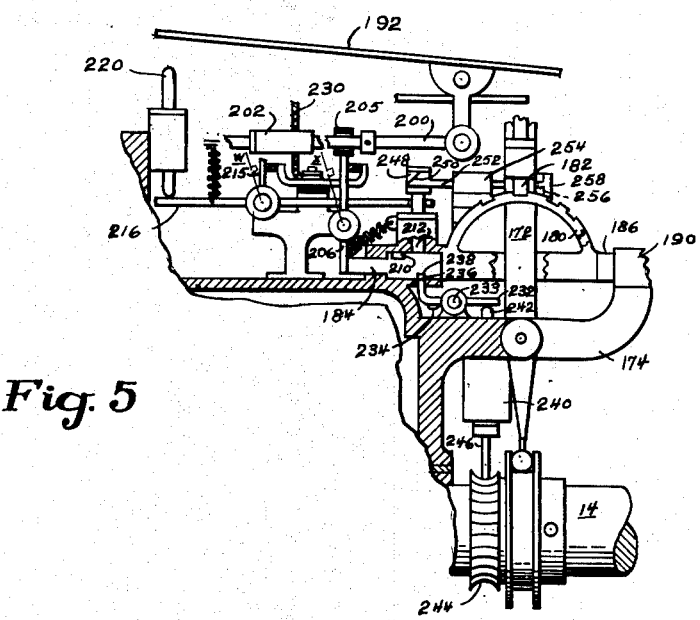
Fig. 5 is a partial view, partly in section, of a modified form of the controlling mechanism of Fig. 1.

Fig. 5 illustrates a modification for selecting and operating the shifting from the turbine drive to direct drive, and vice versa. The control means is accomplished by the accelerator pedal in conjunction with a speed responsive selector which is so arranged as to prevent the shifting of the said segment in accordance with rearward movement of the accelerator pedal 192, except when the speed of the output shaft, and hence the speed of the vehicle, has attained a predetermined value. As shown, such mechanism includes a segment locking lever 232 which is pivoted at 233 to the arm 174, and is provided with a spring 234 which normally urges the lever to the locking position illustrated, where the end 236 is received within a slot 238 of the plunger 184. A speed responsive governor 240 is flexibly mounted on the arm 174 and includes an operating plunger 242 which is adapted to rock the lever 232 to unlock the plunger 184 when the shaft 14 attains a predetermined speed. Any suitable means may be employed for controlling the governor 240, such as a worm gear 244 which drives the governor through a worm, not shown, and a flexible shaft 246. Preferably, the governor is of the snap-acting type which moves the plunger 242 sufficiently to unlock the plunger 184, only when the shaft 14 reaches a predetermined speed. Hence with such an arrangement, it will be readily understood that rearward movement of the accelerator pedal 192 will only be effective to shift the segment 180 in order to shift from forward fluid drive to direct drive, when the speed of the output shaft 14 reaches a predetermined value.

The modified form of the invention also includes means for coordinating the operation of the latching pin 212 with certain of the shifting movements of selector lever 172. More particularly, the pin 212 is formed with an eye 248 which normally receives the camming end 250 of a spring loaded plunger 252, the latter being supported for shifting and bodily movements by a cylinder 254 carried by the segment 180. The spring loading of the plunger 252 is such that the same is resiliently urged toward the right where, prior to the neutral position, the right hand end 256 of the plunger engages a lug 258 which projects rearwardly from the selector lever 172. From this construction, it will be seen that when the lever 172 is moved to the position T, to establish forward fluid drive, the plunger 252 will be withdrawn from the eye 248 in order to allow operation of the pin 212. It will be understood of course, that pin 212 is received within the notch 210 upon rearward movement of the accelerator pedal 192, after the lever 232 has unlocked the plunger 184, this action of the pedal 192 resulting in an automatic shift from forward fluid drive to forward direct drive. In this respect the governor 240 and parts controlled thereby including the lever 232 constitutes a speed responsive selecting means which functions in conjunction with the accelerator pedal 192 to select the direct drive connection when the vehicle speed attains a predetermined value, it being only necessary after said predetermined speed has been reached, to move the accelerator pedal 192 rearwardly as above outlined, in order to establish the direct drive. Thereafter, should it be desired to re-establish the forward fluid drive it is only necessary to depress the accelerator pedal 192 to move the plunger 220 to withdraw the pin 212 from the notch 210 and allow the spring loaded plunger 186 to shift the segment 180 to the left, all as previously set forth in connection with Fig. 1.

Assuming that the shift to direct drive has been effected through operation of the accelerator pedal 192, in conjunction with the speed responsive selector 240, as above outlined, it will be understood that the segment 180 is maintained in the direct drive position by reason of the fact that the pin 212 has dropped into the notch 210. With the parts in the direct drive position, if it is desired to stop the vehicle and return the segment 180 and the lever 172 to their neutral positions, the invention would operate in the following manner.

The engine throttle would first be closed through operation of the accelerator pedal 192, this action relieving the driving torque through the direct drive clutch constituted by the clutch members 168 and 170. The selector lever 172 is then unlatched from the notch T of the segment 180 and the lever is moved about its pivotal mounting 172 towards its neutral position. It will be understood that the initial movement of the lever 172 towards neutral will effect a disengagement of the direct drive clutch 168, 170 as well as a disengagement of the turbine drive clutch constituted by the elements 138 and 160. Also during such movement, the lug 258 attached to the lever 172 will contact the end 256 of the plunger 252 and advance the cam end 250 of said plunger into the eye 248 of the pin 212, thus raising the said pin out of the notch 210 in the plunger 184. As soon as this occurs, the spring loaded plunger 186 will return the segment 180 to its neutral position slightly in advance of the lever 172. Upon return of the segment 180 to its neutral position, the spring 234 will move the segment locking lever 232 so that its end 236 is again received within the notch 238 of the plunger 184. This action securely locks the segment 180 against accidental displacement. Lever 172 will thereupon complete its movement to neutral position and the latch 184 of this lever will again drop into the neutral notch end on the segment 180.

It will also be understood that when a turbine drive has been established, by moving the lever 172 into the notch T to thereby connect the turbine drive clutch member 138 with the driven clutch member 166, the vehicle may be stopped by merely moving the lever 172 to its neutral position. This action readily disconnects the clutch members 166 and 138.

In addition to the foregoing, in the event it is desired to maintain the clutch members 138 and 166 in engagement, and still stop the vehicle, this may be readily effected by depressing the pedal 106, which in practice is closely adjacent the accelerator pedal 192. Initial depression of the pedal 106, as has heretofore been set forth in detail, will cause the fluid to be withdrawn from the working circuit 38. This action effectively disconnects the driving shaft 12 from the output shaft 14. Further movement of the pedal 106 may be utilized for applying the vehicle brakes.

Assuming that the parts are in the position illustrated in Fig. 1, with the vehicle engine idling and the selector lever 172 occupying the neutral position shown, under these conditions, the clutch member 166 will be positioned intermediate the forward driving clutch member 138 and the reverse clutch member 158, so that no driving torque will be transmitted to the output shaft 14. Thus, an absolute neutral position is obtained which avoids any tendencies whatsoever for the output shaft 14 to rotate. It will also be noted that in the neutral position, the brake pedal 106 is retracted and the fluid guide member 36 is firmly locked in a stationary position through the cooperation between the member 114, the anchor gear 122 and the gear 76. The valves 104 are positioned in the left hand extremities of the bores 105 so that communication is freely established between the inlets 92, 94 and 97 and the outlets 98, 100 and 102 of the hydrostatic clutch 78. Hence, the gear pumps composed of the gears 82, 84, 86 and 88 all rotate and pump the working fluid through the inlet and outlet passages referred to above. It will also be understood, that with the invention installed in a motor vehicle, the engine ignition circuit is completed through the cable 230, the stationary terminal member 228 and either of the connections afforded by engaged contacts 222, 225 on the one hand and 224 and 226 on the other.

With the driving shaft 12 rotating, the impeller 30 will also rotate and will draw the working fluid from the impeller intake 44 and force it radially outward in response to the action of centrifugal force thereon. The fluid issuing from the impeller will be received by the blades 48 of the primary turbine 32 and as has been heretofore pointed out, the blades 48 are so curved and arranged that the primary turbine 32 will be rotated in the same direction as the impeller 30. Thereafter, the fluid flows through the vanes 50 of the fluid guide member 36, these vanes being arranged to change the direction of flow of the working fluid and to deliver the same radially inward to the blades 52 of the secondary turbine 34. It will be recalled that the blades 52 are arranged in such a manner that the secondary turbine 34 will be rotated oppositely to that of the primary turbine. After passage of the fluid through the secondary turbine blades, the same flows through the stationary blades 54 of the fluid guide member 36 and is finally delivered to the manifold 34 of the impeller, the direction of flow of the fluid so delivered being similar to the direction of the rotation of the impeller. Thus, the working fluid establishes the toroidal working path 38 which interlinks the blades of the impeller, turbine members and the fluid guide member.

With the fluid unit 10 functioning in the manner above stated, it will be readily seen that the primary and secondary turbines 32 and 34 respectively, are rotated in opposite directions. In view however of the provision of the bevel pinions 56 and the cooperating ring gears 58 and 60, it will be readily perceived that the torques delivered by the turbines are compounded for delivery to the output shaft 14. For example, the compounded torques are delivered to the forward drive clutch member 138 through the sleeve 136, and are also delivered to the rear drive clutch member 158 through the flange member 156, the sleeve 150, and the casing parts 146 and 144. With such an arrangement, the counter-rotating clutch members 138 and 158 are positioned closely adjacent each other and are arranged so that a common terminal point is afforded for readily selecting and establishing either a forward fluid drive or a reverse fluid drive. In this connection, it is also pointed out that the direct drive clutch comprising the members 168 and 170 is also located at the aforesaid common terminal point.

With the fluid unit operating as above stated, if it is desired to establish a reverse drive, it is only necessary to move the selector lever 172 to the position R. This action causes a shifting movement of the output shaft 14 and the clutch member 166 to the right, as viewed in Fig. 1, in order to establish clutching engagement between members 166 and 158. Thereupon, the torque, compounded from the turbines 32 and 34, is directly delivered to the output shaft and from thence to any suitable driven shaft which may be connected thereto.

If a forward fluid drive is desired, the lever 172 is moved in the opposite direction to the position T in order to bring the clutch member 166 into engagement with the primary turbine clutch member 138. Here again, the torques compounded from the primary and secondary turbines are delivered to the output shaft 14. If, after the vehicle is under way, it is desired to establish a direct driving connection, the lever 172 is moved from the notch T to the notch D. The engaged clutch members 138 and 166 are thus moved to the left, compressing the spring 141, and finally bringing the toothed clutch members 168 and 170 into engagement. With the parts in this position, a direct drive is established from the driving shaft 12 to the output shaft 14. It will also be noted that with the establishment of the direct drive, the forward turbine drive is also maintained so that a combined fluid and direct drive is achieved by moving the lever 172 to the position D. In connection with the establishment of the direct drive, it is to be noted that under these conditions, the vehicle engine could be readily started by pushing the vehicle.

As has heretofore been pointed out in detail, the segment 180 is so arranged as to be shiftable in accordance with variations in the position of the accelerator pedal 192. For example, should it be desired to automatically establish a direct drive when the vehicle is being operated in forward fluid drive, it is only necessary to rock the accelerator pedal 192 rearwardly in order to shift the segment 180 to the right. This operation is effective through the cooperation between the collar 204 and the segment shifting lever 206. Upon movement of the segment 180, as indicated, the lever 172 is automatically moved about its pivot 173 a sufficient further distance in a clockwise direction as to establish a direct drive through clutch members 168 and 170. When the shifting of the segment has been completed, the spring loaded latching pin 212 drops into the slot 210 of the segment plunger 184 in order to latch the segment in its direct drive position. As the pin 212 moves to its latched position, the head 214 thereof moves to a position so as to be subsequently operable by pivotal movement of the release lever 216.

The invention in addition to the foregoing, also provides an arrangement, under the control of the accelerator pedal 192, for automatically returning the parts to a position where the direct drive is interrupted and the forward fluid drive is re-established. For this operation, it is only necessary to depress the accelerator pedal 192 in order to rock the lever 216 through the spring loaded plunger 220. As the lever 216 is rocked in a counterclockwise direction about its pivot 218, the arm 215 first interrupts engagement between the contacts 224 and 226. Since the ground connection for the ignition cable 230 has previously been interrupted by movement of the lever 206 to the dotted line position X, it will be readily appreciated that as soon as the arm 215 moves in the manner indicated, the ignition circuit of the engine will be rendered inoperative. This interruption of the ignition circuit interrupts the torque which is followed by the withdrawal of the latching pin 212 and the return of the segment 180 to the position shown, under the influence of the spring loaded plunger 186. The return of the segment re-establishes the turbine drive and the ignition circuit is again completed as soon as the lever 206 is returned to its normal position and effects engagement between the contacts 222 and 225.

In addition to the foregoing novel features, the invention provides a novel method and apparatus for withdrawing, withholding and returning the working fluid from and to the working circuit 38 without removing the fluid from the fluid unit 10. This provides an unusually simplified and highly effective means for hydraulically disconnecting the driving shaft 12 and the impeller 30 from the driven members including the turbines 32 and 34. These operations are all effected by controlling the rotation of the fluid guide member 36 through the control of the hydrostatic clutch 78 by the brake pedal 106. As heretofore pointed out, when the parts occupy the position shown in Fig. 1, the fluid guide member 36 is stationary. If at any time, it is desired to withdraw and withhold the working fluid from the circuit 38, it is only necessary to depress the brake pedal 106 a distance sufficient to move the member 114 from the position A to the position C so as to disengage the toothed flange 116 from the teeth 120 and bring the valves 104 to a full interrupting position. As soon as these operations are accomplished, the fluid within the hydrostatic clutch 78 is confined or locked therein and the fluid guide member 36 will be rotated at the same speed as the impeller 30. Due to the action of centrifugal force on the working fluid, the same will be withdrawn from the circuit 38 and will occupy the area defined by the blades 50. Thus it is seen that the flow of torque through the fluid unit 10 is effectively interrupted and this construction avoids the use of expensive and complicated friction clutch devices. The operation just referred to is highly desirable in order to effect a declutching action when a fluid drive is established, or when the vehicle engine is idling at a stop line. This action is also advantageous to cool the fluid during shop inspection and when driving in direct drive.

If desired, the pedal 106 may be allowed to be partially returned to its normal position, under the influence of spring 116 in order to move the valves 104 to variably restrict the passages between the gear pumps and the exhaust openings 98, 100 and 102. Under these conditions, and assuming that the toothed flange 116 is not re-engaged with the teeth 120, the hydrostatic clutch 78 may be operated in a slipping condition where the speed of rotation of the fluid guide member 36 is less than that of the impeller 30. A partial torque conversion is thereby effected and this may be graduated from zero to a maximum, the latter limit being reached when the member 114 is finally returned to the position A and the rotation of the fluid guide member 36 is positively prevented. It will be readily understood that when the member 114 is finally returned to the position A and the fluid guide member 36 is stationary, the working path 38 for the working fluid will be fully re-established.

Fig. 5 provides a modified form of the invention which includes the provision of a speed responsive means in conjunction with the accelerator pedal for the shiftable segment 180. It is believed that the operation of this form of the invention is readily apparent from the detailed description thereof heretofore outlined.

From the foregoing, it will be readily perceived that the present invention provides a novel power transmission of the hydraulic torque converter type. The provision of the bevel pinions 56 and the ring gears 58 and 60 secures an unusually efficient arrangement for compounding the torques of the primary and secondary turbines. It will be also noted that the fabrication of the fluid guide member 36 in two sections, with the subsequent union of these, enables the bevel pinions 56 to be sealed within the member 36 and to occupy a position internally of the fluid working path 38. This construction prevents the accumulation of excess working fluid in this area. The invention moreover provides a compact arrangement for securing forward, reverse and direct drives and provides also an absolute neutral condition when the clutch member 166 is spaced from the turbine clutch members 138 and 158. In addition to the foregoing, the provision of the selector lever 172, the shiftable segment 180, and the control devices for the latter, secures a novel control system which is readily adapted to existing types of motor vehicles.

While the invention has been shown and described herein with considerable particularity, it will be readily understood by those skilled in the art that various modifications may be resorted to without departing from the spirit of the invention. For example, if it is desired to employ a servomotor to shift from fluid drive to direct drive, the accelerator pedal 192 and its linkage 200 will serve to operate a switch or valve, etc. Reference will therefore be had to the appended claims for a definition of the limits of the invention.

What is claimed is:

1. A hydraulic transmission comprising a casing containing a working fluid, a rotatable bladed impeller for establishing a circulation of the working fluid in a closed path, a pair of bladed turbine members in the path of the working fluid rotatable in opposite directions, a pair of driven members positioned closely adjacent each other and respectively connected with said turbine members, and gear means for connecting said turbine members to compound the torques delivered thereby, an output member, and means for selectively connecting said output member with either of said driven members.

2. A hydraulic transmission comprising a casing containing a working fluid, a rotatable bladed impeller for establishing a circulation of the working fluid in a closed path, a pair of bladed turbine members in the path of the working fluid and rotatable in opposite directions, a pair of driven members positioned closely adjacent each other and respectively connected with said turbine members, means connecting said turbine members to deliver the combined torques of both turbine members to either of said driven members, an output member, and means for selectively connecting said output member with either of said driven members.

3. A hydraulic transmission comprising a casing containing a working fluid, a rotatable bladed impeller for establishing a circulation of the working fluid in a toroidal path, a bladed turbine member rotating in one direction and positioned at one side of said path, a second bladed turbine member rotating in the opposite direction and positioned at the other side of said path, a pair of driven members positioned closely adjacent each other and respectively connected with said turbine members, and gear means positioned between said turbine members and in the center of said path of working fluid for connecting said turbine members to compound the torques delivered thereby.

4. A fluid transmission comprising a casing, a rotatable impeller within the casing, primary and secondary turbines within the casing, said impeller and turbines establishing a circulation of working fluid in a closed path for the transmission of torque, said turbines being bladed so as to rotate in opposite directions in response to the working fluid acting thereon, and gear means positioned in the center of said closed path for connecting said turbines to compound the torques delivered thereby.

5. A hydraulic transmission comprising a casing containing a working fluid, a rotatable bladed impeller for establishing a circulation of the working fluid in a closed path, a pair of bladed turbine members in the path of the working fluid and rotatable in opposite directions, a pair of driven members positioned closely adjacent each other, a pair of coaxial, relatively rotatable sleeves respectively connected with said driven members, means to connect one of said sleeves to one of said turbine members, means including said casing for connecting the other sleeve to the other turbine member, means connecting said turbine members to deliver the combined torques of both turbine members to either of said driven members, an output member, and means for selectively connecting said output member with either of said driven members.

6. A hydraulic transmission as set forth in claim 5 which comprises in addition, an output member, and means shiftable in opposite directions for selectively connecting either of said driven members and said output member.

7. A hydraulic transmission comprising a casing containing a working fluid, a rotatable bladed impeller for establishing a circulation of the working fluid in a closed path, a pair of bladed turbine members in the path of the working fluid and rotatable in opposite directions, a pair of spaced apart driven members respectively connected with said turbine members, means connecting said turbine members to deliver the combined torques of both turbine members to either of said driven members, an output member, means connected with the output member and having a shiftable part positioned between said driven members but normally spaced from both, and means to shift said part in opposite directions to selectively engage the output member with either of said driven members to rotate the output member in one direction or the other depending upon the driven member engaged.

8. A fluid transmission comprising a casing, a rotatable impeller within the casing, primary and secondary turbines within the casing, said impeller and turbines establishing a circulation of working fluid in a closed path for the transmission of torque, said turbines being bladed so as to rotate in opposite directions in response to the working fluid acting thereon, a driven member connected with the primary turbine, a second driven member connected with the secondary turbine, an output member, means shiftable in opposite directions for selectively connecting either of said driven members and said output member, and gear means positioned in the center of said closed path for connecting said turbines to compound the torques delivered thereby.

9. A hydraulic transmission comprising a casing containing a working fluid, a rotatable bladed impeller for establishing a circulation of the working fluid in a closed path, a pair of bladed turbine members in the path of the working fluid and rotatable in opposite directions, a pair of coaxially arranged driven clutches respectively connected with said turbine members, a driving shaft operatively connected with the impeller and having a direct drive clutch coaxially positioned with respect to said driven clutches, an output member, and means movable to selectively connect said output member with either of said driven clutches or with said direct drive clutch.

10. A hydraulic transmission comprising a casing containing a working fluid, a rotatable bladed impeller for establishing a circulation of the working fluid in a closed path, a pair of bladed turbine members in the path of the working fluid and rotatable in opposite directions, a pair of driven clutches respectively connected with said turbine members, a driving shaft operatively connected with the impeller and having a direct drive clutch, an output member, a shiftable output clutch member operatively connected with the output member and normally positioned as to be spaced from all of said clutches, and means for selectively shifting said output clutch member to connect the latter with either of said driven clutches and to sequentially connect the output clutch member first with one of the driven clutches and then with said direct drive clutch.

11. In a fluid power transmission of the type having an impeller member and primary and secondary turbine members, a casing containing a working fluid, said members cooperating with said fluid to direct the latter in a closed circuit to transmit torque from the impeller member to the turbine members and to rotate the latter members in opposite directions, a pair of driven members respectively connected with the turbine members, means connecting said turbine members to deliver the combined torques of both turbine members to either of said driven members, and a fluid guide member within the casing provided with an outer bladed area for conducting the working fluid from one turbine member to the other, and also provided with an inner bladed area for conducting the fluid from said other turbine member to the impeller.

12. In a fluid power transmission of the type having an impeller member and primary and secondary turbine members, a casing containing a working fluid, said members cooperating with said fluid to direct the latter in a closed circuit to transmit the torque from the impeller member to the turbine members and to rotate the latter members in opposite directions, a pair of driven members respectively connected with the turbine members and being rotatable thereby in opposite directions, means including a gear for connecting said turbine members to compound the torques delivered thereby, and a fluid guide member within the casing provided with an outer bladed area for conducting the working fluid from one turbine member to the other, and also provided with an inner bladed area for conducting the fluid from said other turbine member to the impeller, and said fluid guide member having an annular section positioned within the center of said closed circuit and supporting said gear.

13. In a fluid power transmission of the type having an impeller member and primary and secondary turbine members, a casing containing a working fluid, said members cooperating with said fluid to direct the latter in a closed circuit to transmit torque from the impeller member to the turbine members, said turbine members being connected to rotate in opposite directions, a fluid guide member having an outer bladed area surrounding the impeller and turbine members and having also an inner bladed area between one of the turbine members and the impeller, means for connecting said fluid guide member and impeller so that the former will be rotated at the same speed as the latter, and means to lock the fluid guide member in a stationary position.

14. In a fluid power transmission of the type having an impeller member and primary and secondary turbine members, a casing containing a working fluid, said members cooperating with said fluid to direct the latter in a closed circuit to transmit torque from the impeller member to the turbine members, said turbine members being connected to rotate in opposite directions, a fluid guide member having an outer bladed area surrounding the impeller and turbine members and having also an inner bladed area between one of the turbine members and the impeller, and having also a clutch arranged coaxially with respect to the impeller member, and means for selectively locking said fluid guide member in a stationary position or for rotating the same with the impeller comprising, shiftable means movable in one direction to connect said clutch with a stationary part, and movable in another direction to connect the fluid guide member with the impeller.

15. A hydraulic transmission having a casing housing impeller, turbine and reaction members, all cooperative to establish a toroidal flow of working fluid for the transmission of torque from the impeller to the turbine, said turbine member being fixed against axial movement in the casing, a driving shaft for the impeller, a driven shaft, means operable to selectively connect the driven shaft with the turbine to establish a fluid drive or to connect the driven shaft with the driving shaft to establish a direct drive, means for retaining the selectively operable means in the direct drive position, means for releasing said retaining means, and means to automatically operate the selectively operable means to automatically establish the fluid drive connection upon release of said retaining means.

16. A hydraulic transmission having a casing housing impeller, turbine and reaction members, all cooperative to establish a toroidal flow of working fluid for the transmission of torque from the impeller to the turbine, said turbine member being fixed against axial movement in the casing, a driving shaft for the impeller, a driven shaft, means operable to selectively connect the driven shaft with the turbine to establish a fluid drive or to connect the driven shaft with the driving shaft to establish a direct drive, while maintaining the fluid drive connection, resilient means arranged to be compressed during the establishment of direct drive, manually operable means for operating the selectively operable means, means for latching said selectively operable means in the direct drive position, and means operable at will to release the latching means to allow the compressed resilient means to disconnect the direct drive connection while maintaining the fluid drive connection.

17. A controlling mechanism for a motor vehicle of the type having a throttle-controlled engine for delivering torque and provided with a driving shaft, an output shaft and a hydraulic transmission connected with said driving shaft, an accelerator member movable in opposite directions to open and close said throttle, means controlled by movement of said accelerator member when the throttle is in closed position to connect the output shaft directly with the driving shaft to establish a direct drive, and means operable by said member upon movement thereof beyond open throttle position for disconnecting said direct drive and connecting said output shaft with the driving shaft through the hydraulic transmission to establish a fluid drive.

18. A controlling mechanism as set forth in claim 17 which comprises in addition, means controlled by said movement of the accelerator member beyond open throttle position to interrupt the engine torque prior to disconnecting of the direct drive and to re-establish the torque after the fluid drive has been established.

19. A controlling mechanism for a motor vehicle of the type having a throttle-controlled engine for delivering torque and provided with a driving shaft, an output shaft and a hydraulic transmission connected with said driving shaft, a fluid drive member connected with said hydraulic transmission, a direct drive member connected with said driving shaft, means shiftable in one direction to first drivably connect the output shaft with the fluid drive member to establish a fluid drive and to thereafter connect the output shaft with the direct drive member to establish a direct drive, an accelerator member movable in opposite directions to open and close said throttle, means responsive to the speed of said output shaft and operating in conjunction with the accelerator member to establish said direct drive, and means operable by said accelerator member upon movement thereof beyond the open throttle position to disconnect said direct drive and establish a fluid drive connection between the driving and output shafts.

20. A controlling mechanism as set forth in claim 19 which comprises in addition, means controlled by movement of the accelerator member beyond the open throttle position to interrupt the engine torque prior to disconnecting of the direct drive and to re-establish the torque after the fluid drive has been established.

21. A controlling mechanism as set forth in claim 19 which comprises in addition, an ignition circuit for the engine, and means controlled by movement of the accelerator member beyond the open throttle position to interrupt said ignition circuit to interrupt the engine torque prior to disconnecting of the direct drive, and to re-establish the ignition system to re-establish the torque after the fluid drive has been established.

22. A controlling mechanism for a motor vehicle of the type having a throttle-controlled engine for delivering torque and provided with a driving shaft, an output shaft and a fluid transmission connected with said driving shaft and having a turbine shaft and also provided with a fluid circulating system, an accelerator member movable in opposite directions to open and close said throttle, selector means movable to connect the output shaft with said driving shaft or with said turbine shaft to respectively establish direct drive or fluid drive, speed responsive selector means actuated at a predetermined speed of said output shaft to select one of said drives while the other drive is established, and means operable upon movement of the accelerator member in one direction for establishing said selected drive.

23. A controlling mechanism as set forth in claim 22 which comprises in addition, means for at will arresting the circulation of fluid in said system.

24. A controlling mechanism for a motor vehicle of the type having a throttle-controlled engine for delivering torque and provided with a driving shaft, an output shaft and a fluid transmission connected with said driving shaft and having a turbine shaft and also provided with a fluid circulating system, an accelerator member movable in opposite directions to open and close said throttle, selector means movable to connect the output shaft with said driving shaft or with said turbine shaft to respectively establish direct drive or fluid drive, speed responsive selector means actuated at a predetermined speed of said output shaft to select one of said drives while the other drive is established, means operable upon movement of the accelerator member in one direction for establishing said selected drive, and means operable upon movement of said accelerator member beyond its throttle controlling movement to interrupt said selected drive and establish the other drive.

25. A controlling mechanism for a motor vehicle of the type having a throttle-controlled engine for delivering torque and provided with a driving shaft, an output shaft and a fluid transmission connected with said driving shaft and having a turbine shaft and also provided with a fluid circulating system, an accelerator member movable in opposite directions to open and close said throttle, selector means movable to connect the output shaft with said driving shaft or with said turbine shaft to respectively establish direct drive or fluid drive, speed responsive selector means actuated at a predetermined speed of said output shaft to select one of said drives while the other drive is established, means operable upon movement of the accelerator member in one direction for establishing said selected drive, means operable upon movement of said accelerator member beyond its throttle controlling movement to interrupt said selected drive and establish the other drive, and means to interrupt the engine torque prior to interruption of said selected drive and to re-establish the torque after the other drive has been established.

26. A controlling mechanism for a motor vehicle of the type having a throttle-controlled engine for delivering torque and provided with a driving shaft, an output shaft and a fluid transmission connected with said driving shaft and having a turbine shaft and also provided with a fluid circulating system, an accelerator member movable in opposite directions to open and close said throttle, means movable to connect the output shaft with the driving shaft or with the turbine shaft to respectively establish direct drive or fluid drive, speed responsive means cooperating with said movable means, and selecting means controlled by the accelerator pedal in conjunction with said speed responsive means for selecting one or the other of said drives.

27. A controlling mechanism as set forth in claim 26 which comprises in addition, means for at will arresting the circulation of fluid in said system.

28. A hydraulic transmission comprising a casing containing a working fluid, a rotatable bladed impeller for establishing a circulation of the working fluid in a closed path, a pair of bladed turbine members in the path of the working fluid and rotatable in opposite directions, a pair of coaxially arranged driven clutches respectively connected with said turbine members, a driving shaft operatively connected with the impeller and having a direct drive clutch coaxially positioned with respect to said driven clutches, an output member, and a manually operable controlling element movable at will to selectively connect said output member with either of said driven clutches or directly with said direct drive clutch.

29. A hydraulic transmission comprising a casing containing a working fluid, a rotatable bladed impeller for establishing a circulation of the working fluid in a closed path, a pair of bladed turbine members in the path of the working fluid and rotatable in opposite directions, a pair of driven clutch members respectively connected with said turbine members, a driving shaft operatively connected with the impeller and having a direct drive clutch member, an output member, a shiftable output clutch member operatively connected with the output member and normally positioned as to be spaced from all of said clutch members, and a manually operable controlling element movable at will for selectively shifting said output clutch member to connect the latter with either of said driven clutch members and to sequentially connect the output clutch member first, with one of the driven clutch members and then directly with said direct drive clutch member.

30. A controlling mechanism for a motor vehicle of the type having a throttle-controlled engine for delivering torque and provided with a driving shaft, an output shaft and a fluid transmission connected with said driving shaft and having a turbine shaft and also provided with a fluid circulating system, an accelerator member movable in opposite directions to open and close said throttle, means including a manually operable controlling element movable at will to connected the output shaft directly with the driving shaft or with the turbine shaft to respectively establish direct drive or fluid drive, speed responsive means cooperating with said first-named means, and selecting means controlled by the accelerator pedal in conjunction with said speed responsive means for selecting one or the other of said drives.

31. A fluid power transmission mechanism for a vehicle having an engine, a driving shaft and an output shaft, comprising a casing containing a working fluid, an impeller within the casing connected with the driving shaft for circulating the fluid in the casing, fluid guide members within the casing for guiding the fluid in a closed path, a pair of bladed turbine members within the casing, a pair of driven clutch sleeves respectively connected with said turbine members, means connecting said turbine members to combine the torques thereof and to rotate one of said clutch sleeves in one direction to provide a forward turbine drive, and to rotate the other clutch sleeve in another direction to provide a reverse turbine drive, one of said sleeves surrounding the driving shaft, and the other sleeve being rotatably mounted on said one sleeve, a pair of turbine clutch members respectively secured to said clutch sleeves, an output clutch member drivably connected with the output shaft and positioned between said turbine clutch members, a direct driving clutch member connected with the driving shaft and positioned adjacent the turbine clutch members, and means operable to selectively directly connect the output clutch member with the direct driving clutch member to establish a direct drive, or to connect the output clutch member with either of said turbine clutch members to establish a forward or a reverse turbine drive.

32. A fluid power transmission mechanism for a vehicle having an engine, a driving shaft and an output shaft, comprising a casing containing a working fluid, an impeller within the casing connected with the driving shaft for circulating the fluid in the casing, fluid guide members within the casing for guiding the fluid in a closed path, a pair of bladed turbine members within the casing, a pair of driven clutch sleeves respectively connected with said turbine members, means connecting said turbine members to combine the torques thereof and to rotate one of said clutch sleeves in one direction to provide a forward turbine drive, and to rotate the other clutch sleeve in another direction to provide a reverse turbine drive, one of said sleeves surrounding the driving shaft, and the other sleeve being rotatably mounted on said one sleeve, a pair of turbine clutch members respectively secured to said clutch sleeves, an output clutch member drivably connected with the output shaft and positioned between said turbine clutch members, a direct driving clutch member connected with the driving shaft and positioned adjacent the turbine clutch members, and a manually operable controlling element operable at will to connect the output clutch member with either of said turbine clutch members to establish a forward or a reverse turbine drive or to connect the output clutch member directly with the direct driving clutch member to establish a direct drive.

33. A fluid power transmission mechanism for a vehicle having an engine, a driving shaft and an output shaft, comprising a casing containing a working fluid, an impeller within the casing connected with the driving shaft for circulating the fluid in the casing, fluid guide members within the casing for guiding the fluid in a closed path, a pair of bladed turbine members within the casing, a pair of driven clutch sleeves respectively connected with said turbine members, means connecting said turbine members to combine the torques thereof and to rotate one of said clutch sleeves in one direction to provide a forward turbine drive, and to rotate the other clutch sleeve in another direction to provide a reverse turbine drive, one of said sleeves surrounding the driving shaft, and the other sleeve being rotatably mounted on said one sleeve, a pair of turbine clutch members respectively secured to said clutch sleeves, an output clutch member drivably connected with the output shaft and positioned between said turbine clutch members, a direct driving clutch member connected with the driving shaft and positioned adjacent the turbine clutch members, means operable to selectively directly connect the output clutch member with the direct driving clutch member to establish a direct drive, or to connect the output clutch member with either of said turbine clutch members to establish a forward or a reverse turbine drive, and means responsive to the speed of the output shaft for controlling the operation of the selectively operable means.

34. A fluid power transmission mechanism for a vehicle having an engine, a driving shaft and an output shaft, comprising a casing containing a working fluid, an impeller within the casing connected with the driving shaft for circulating the fluid in the casing, fluid guide members within the casing for guiding the fluid in a closed path, a pair of bladed turbine members within the casing, a pair of driven clutch sleeves respectively connected with said turbine members, means connecting said turbine members to combine the torques thereof and to rotate one of said clutch sleeves in one direction to provide a forward turbine drive, and to rotate the other clutch sleeve in another direction to provide a reverse turbine drive, one of said sleeves surrounding the driving shaft, and the other sleeve being rotatably mounted on said one sleeve, a pair of turbine clutch members respectively secured to said clutch sleeves, an output clutch member drivably connected with the output shaft and positioned between said turbine clutch members, a direct driving clutch member connected with the driving shaft and positioned adjacent the turbine clutch members, means operable to selectively directly connect the output clutch member with the direct driving clutch member to establish a direct drive, or to connect the output clutch member with either of said turbine clutch members to establish a forward or a reverse turbine drive, means to interrupt the engine torque prior to disconnecting the direct drive, and means to reestablish the engine torque upon the establishment of direct turbine drive.

35. A fluid power transmission mechanism for a vehicle having an engine, a driving shaft and an output shaft, comprising a casing containing a working fluid, an impeller within the casing connected with the driving shaft for circulating the fluid in the casing, fluid guide members within the casing for guiding the fluid in a closed path, a pair of bladed turbine members within the casing, a pair of driven clutch sleeves respectively connected with said turbine members, means connecting said turbine members to combine the torques thereof and to rotate one of said clutch sleeves in one direction to provide a forward turbine drive, and to rotate the other clutch sleeve in another direction to provide a reverse turbine drive, one of said sleeves surrounding the driving shaft, and the other sleeve being rotatably mounted on said one sleeve, a pair of turbine clutch members respectively secured to said clutch sleeves, an output clutch member drivably connected with the output shaft and positioned between said turbine clutch members, a direct driving clutch member connected with the driving shaft and positioned adjacent the turbine clutch members, means operable to selectively directly connect the output clutch member with the direct driving clutch member to establish a direct drive, or to connect the output clutch member with either of said turbine clutch members to establish a forward or a reverse turbine drive, and controlling means operable at will to neutralize the transmission mechanism while the output clutch member is connected with either of said turbine clutch members.

36. A hydraulic transmission mechanism for a motor vehicle having a driving shaft, an output shaft, and a manually operable vehicle controlling element, comprising a casing containing a working fluid, an impeller connected with the driving shaft for circulating said fluid in the casing in a closed path, a turbine member within the casing, a fluid guide member within the casing for guiding the circulating fluid in said closed path, means operable to selectively connect the output shaft with the turbine member for turbine drive or with the driving shaft for direct drive, and control means for arresting the circulation of fluid while the direct drive is established.

EDWARD J. THURBER.

REFERENCES CITED

The following references are of record in the file of this patent:

UNITED STATES PATENTS

| Number | Name | Date |
|---|---|---|
| 1,298,990 | Mason | Apr. 1, 1919 |
| 1,960,705 | Kochling | May 29, 1934 |
| 2,014,944 | Martyrer et al. | Sept. 17, 1935 |
| 2,152,113 | Van Lammeren | Mar. 28, 1939 |
| 2,162,803 | England | June 20, 1939 |
| 2,205,794 | Jandasek | June 25, 1940 |
| 2,260,015 | Fichtner | Oct. 21, 1941 |
| 2,264,444 | Ljungstrom | Dec. 2, 1941 |
| 2,309,559 | Wemp | Jan. 26, 1943 |
| 2,313,645 | Jandasek | Mar. 9, 1943 |
| 2,341,163 | Schjolin | Feb. 8, 1944 |
| 2,341,921 | Jandasek | Feb. 15, 1944 |
| 2,349,350 | Jandasek | May 23, 1944 |
| 2,377,009 | Heyer | May 29, 1945 |
| 2,388,849 | Jandasek | Nov. 13, 1945 |
| 2,449,608 | Le May | Sept. 21, 1948 |
| 2,465,739 | McGill | Mar. 29, 1949 |
| 2,550,082 | Orr | Apr. 24, 1951 |